United States Patent [19]

Omori et al.

[11] Patent Number: 4,933,540
[45] Date of Patent: Jun. 12, 1990

[54] IC CARD

[75] Inventors: Makoto Omori; Toshinobu Banjo; Shigeo Onoda, all of Itami, Japan

[73] Assignee: Mitsubishi Denki Kabushiki Kaisha, Japan

[21] Appl. No.: 169,459

[22] Filed: Mar. 17, 1988

[30] Foreign Application Priority Data

Mar. 20, 1987 [JP] Japan .................................. 62-66258

[51] Int. Cl.⁵ .......................................... G05K 19/06
[52] U.S. Cl. .................................. 235/492; 235/441; 439/137
[58] Field of Search ...................... 235/380, 492, 441; 439/136, 137, 140, 131

[56] References Cited

U.S. PATENT DOCUMENTS 4,695,925 9/1987 Kodai et al. ...................... 439/131
4,767,348 8/1988 Murakami ........................... 439/140

Primary Examiner—David L. Trafton
Attorney, Agent, or Firm—Leydig, Voit & Mayer

[57] ABSTRACT

An IC card has a shutter reciprocatively mounted on a frame in order to protect a plurality of external-element connection terminals which are mounted on the frame. Guide grooves formed in the frame include those which receive corresponding projections formed on spring-mounting portions of the shutter to keep the projections in engagement therewith, thereby enabling both the base portion and the spring-mounting portion of the shutter to be guided. End portions at one end of those guide grooves determine a position of the shutter such that the shutter is prevented from overshooting the frame. Thus, the IC card is capable of ensuring stable opening and closing action of the shutter.

2 Claims, 3 Drawing Sheets

IC CARD

BACKGROUND OF THE INVENTION

The present invention relates to an IC card incorporating components such as microcomputer chips and memory chips.

A conventional IC card of the type stated above is illustrated in FIGS. 1 to 3. As shown in these Figures, the conventional IC card has a thin shutter 2 for protecting external-element connection terminals 100 (see FIG. 1), and the shutter 2 is mounted on the frame 1 of the IC card so as to be slidable back and forth, i.e., in the direction of the arrow A shown in FIGS. 1 and 2. The frame 1 incorporates a printed board (not shown) on which semiconductor chips (also not shown) are mounted, the terminals 100 are also mounted on the printed board in the portion of front end thereof and are exposed when the shutter 2 is open. The shutter 2 has a base portion 3 and spring-mounting portions 4. Projections 3a and 4a are respectively formed on the shutter base portion 3 and the corresponding spring-mounting portions 4, and these projections 3a and 4a each extend along the side portions of the frame 1. Tensile springs 5 are disposed between the corresponding projection 4a formed on the portion 4 and a fixing pin 1a secured on the frame 1 to provide return tension for the shutter 2, so that the shutter 2 returns to a normal position, that is the closed position, shown in the figures when the IC card is not being used. The frame 1 is formed with guide grooves 7 which each receive therein the corresponding projection 3a of the base portion 3, so that the shutter 2 can be guided back and forth in the direction indicated by the arrow A. A stopper 8 for the shutter 2 is formed at one end portion of the frame 1. The IC card also has metal panels 6 provided on the upper and lower surfaces of the frame 1 to cover components such as semiconductor chips (not shown). An insulating material coats all of the metal panels 6.

When the IC card having the construction described above is used, the card is inserted into a card receptacle (not shown) of a card reader (not shown). At this time, the shutter 2 is moved backward against the tension of the springs 5 and assumes an opened condition in which the external-element connection terminal 100 of the IC card are connected to electrodes within the card reader respectively.

When the IC card is pulled out of the card receptacle, the external-element connection terminals 100 of the IC card are disconnected from the electrodes within the card reader, and the shutter 2 is moved forward by the tension of the springs 5 until it abuts against the stopper 8 and closes.

The conventional, IC card of this type is, however, not provided with means to guide the spring-mounting portions 4. Consequently, there is a risk that, during the opening or closing of the shutter 2, the rear part of the shutter 2 formed by the spring-mounting portions 4 may laterally move. In addition, although the stopper 8 is formed on the frame 1 and functions to stop the shutter 2 when it closes, the height of the stopper 8 is relatively low (e.g., about 0.2 mm) because of the specification for the overall structure of the IC card. Consequently, there is a risk that, when the shutter 2 closes, it may overshoot the stopper 8 and move forward to the outside of the frame 1. In this way, the conventional IC card fails to provide stable opening and closing action of the shutter 2.

SUMMARY OF THE INVENTION

The present invention has been accomplished in view of these circumstances. It is an object of the present invention to provide an IC card which is capable of preventing any lateral movement of the spring-mounting portions of the shutter when the shutter is opening or closing, and preventing the shutter from overshooting the frame of the IC card and moving forward to the outside when the shutter closes, thereby ensuring stable opening and closing action of the shutter.

According to the present invention, a frame of an IC card is formed with, in addition to guide grooves as in the conventional IC card, second guide grooves which receive corresponding projections of spring-mounting portions of the shutter to keep the projections in engagement therewith. The second guide grooves each have an end portion at the front end thereof which is formed to determine the forward closed position of the shutter so that the shutter is prevented from overshooting the frame.

With the IC card in accordance with the present invention, therefore, the shutter can be guided in such a manner that the shutter does not move laterally when it is opening or closing, and the shutter can be prevented from overshooting the frame forward to the outside when the shutter closes.

DESCRIPTION OF THE PREFERRED EMBODIMENT

Figure 1:
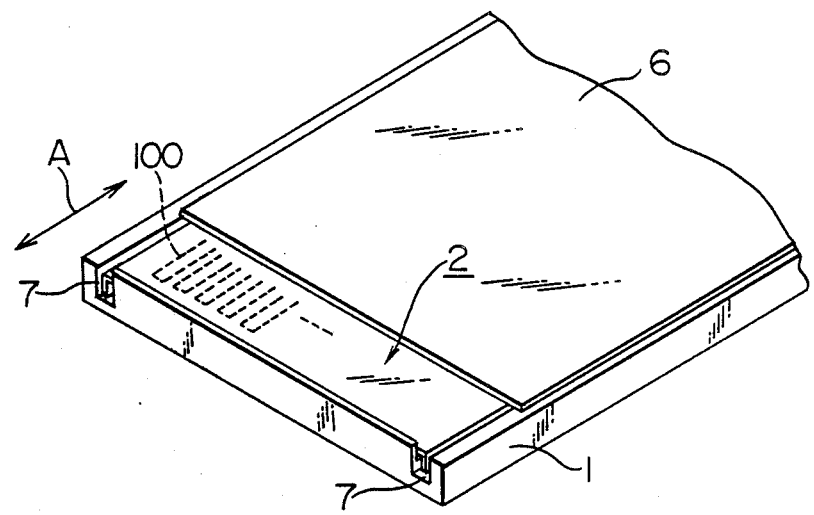
FIG. 1 is a partially sectional perspective view of a conventional IC card.
Figure 2:
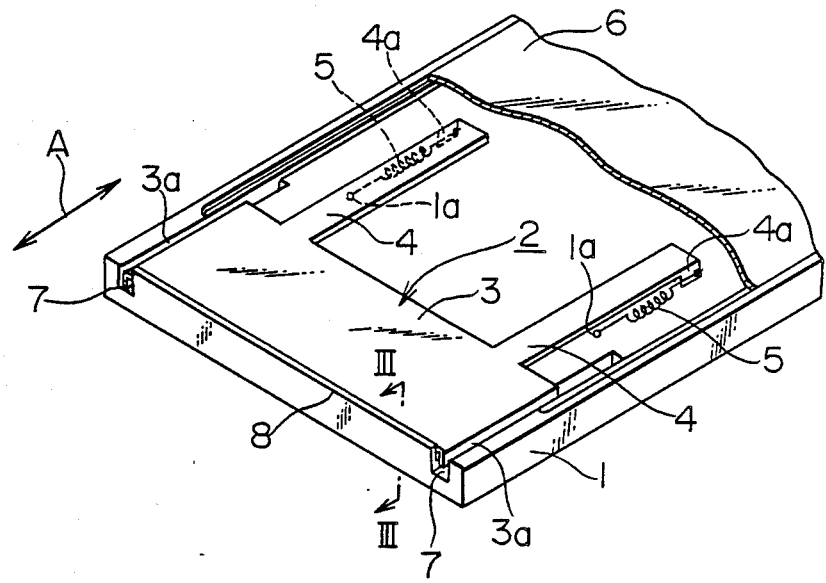
FIG. 2 is a fragmentary perspective view of the IC card of FIG. 1 for showing a construction of a shutter.
Figure 3:
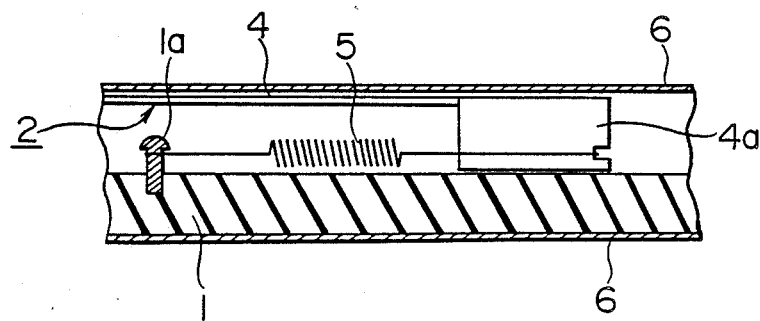
FIG. 3 is a partially sectional view taken along the line III—III shown in FIG. 2.
Figure 4:
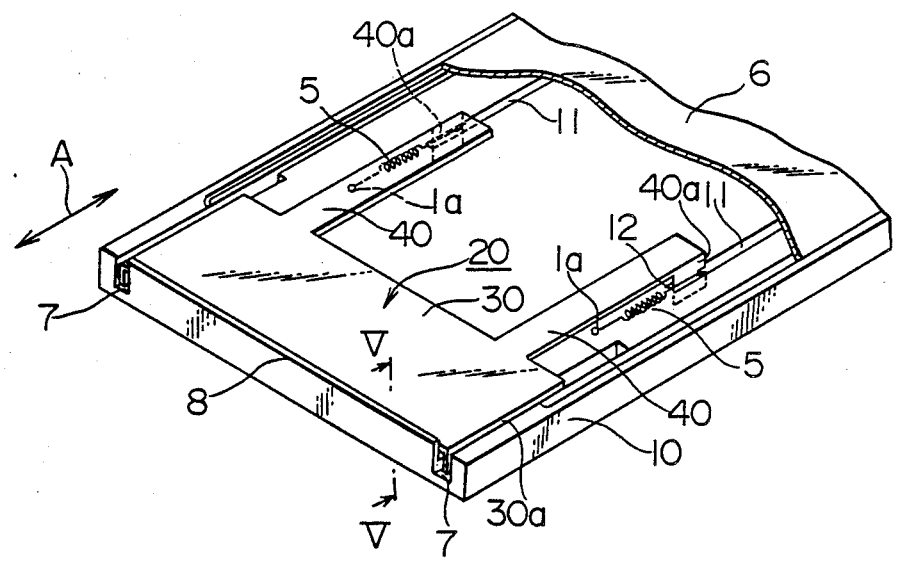
FIG. 4 is a partially sectioned, fragmentary perspective view of an IC card in accordance with an embodiment of the present invention.
Figure 5:
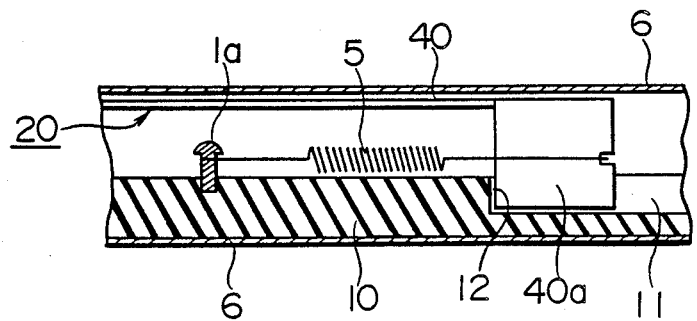
FIG. 5 is a partially sectional view taken along the line V—V shown in FIG. 4.

FIGS. 4 and 5 are a partially sectioned, fragmentary perspective view and a sectional view, respectively, which illustrate an IC card according to an embodiment of the present invention. In these figures, reference numerals which are the same as or correspond to those in FIGS. 1 through 3 are used to denote the same or corresponding members, and detailed description of these members will be omitted. As shown in FIGS. 4 and 5, the IC card has a shutter 20 which in turn has a base portion 30 and spring-mounting portions 40. A frame 10 of the IC card is formed with guide grooves 11 extending in the back and forth direction. The guide grooves 11 receive therein corresponding projections 40a formed on the spring-mounting portions 40 to keep the projections 40a in engagement therewith, and the grooves 11 extend to guide the projections 40a, whereby the shutter 20 is guided in the direction of the arrow A when it reciprocates. Each of guide grooves 7 and the second guide grooves 11 has a length at least equal to the stroke of reciprocation of said shutter 20. In addition, each of the second guide grooves 11 has an end portion 12 at one end thereof a forward position of the shutter 20 such that, when the shutter 20 closes, the shutter 20 is stopped before it abuts against stopper 8.

With the IC card having the above-described construction, the frame 10 has the guide grooves 7 and 11 formed therein for guiding the shutter 20 in its reciprocating direction, i.e., in the back and forth direction, and the guide grooves 11 that receive the projections 40a of the spring-mounting portions 40 are provided at one end thereof with the end portions 12 determining a forward position of the shutter 20 such that the shutter 20 can be stopped before it abuts against the stopper 8. By virtue of this arrangement, both the shutter base portion 30 and spring-mounting portions 40 can be guided during the opening and closing of the shutter 20, and the projections 40a of the spring-mounting portions 40 can be brought into contact with the end portions 12 of the guide grooves 11. Therefore, it is possible to prevent any lateral movement of the rear portion of the shutter 20, i.e., of the spring-mounting portions 40, and also prevent overshooting of the shutter 20.

This arrangement of the present invention also provides the following advantages. With the conventional arrangement, the shutter is stopped by abutting against the stopper 8. Consequently, when the shutter, which is about to close, abuts against the stopper 8, the shutter is acted upon by a compression force exerted inwardly through both the front and rear ends of the shutter. Since the shutter is very thin, having a thickness of, for instance, about 0.1 mm, there is a risk that the spring-mounting portions may be bent by such compression force, or break after colliding with the metal panel 6. In contrast, according to the present invention, the shutter 20 is stopped with its spring-mounting portions 40 being in contact with the end portions 12 of the guide grooves 11. Therefore, it is possible to keep any compression force from acting on the shutter 20 over the entire length thereof in the back and forth direction, thereby preventing the spring-mounting portions 40 from being bent or broken from colliding with the metal panel 6.

As described above, according to the present invention, the frame of the IC card is provided with guide grooves formed therein in correspondence with the base portion and each of the spring-mounting portions of the shutter respectively. Further, the guide grooves that correspond to the spring-mounting portions have end portions at one end thereof which are capable of determining a certain forward position of the shutter. Accordingly, it is possible to prevent any lateral movement of the rear part of the shutter during its opening or closing action, and also prevent the shutter from overshooting forward to the outside when it closes, thereby ensuring stable opening and closing action of the shutter.

What is claimed is:

1. An IC card comprising:
   a frame for incorporating components such as semiconductor chips in said IC card, said frame having a plurality of external-element connection terminals mounted near one end;
   a thin shutter reciprocatingly mounted on said frame to cover and uncover said plurality of terminals, said shutter having a base portion and at least one spring-mounting portion extending from said base portion toward the rear of the reciprocation direction;
   at least one projection formed on each of said base portion and said spring-mounting portion extending along sides of said frame;
   springs disposed between said mounting portion of said shutter and said frame for reciprocating said shutter;
   guide grooves formed in said formed in said frame in correspondence with said respective projections formed on said base portion and said spring-mounting portion, each of which receives therein a corresponding projection to keep the projection in engagement with the groove, said guide grooves each having a length greater than the stroke of the reciprocation of said shutter for guiding said shutter in the direction of reciprocation; and
   an end portion formed at one end of the guide grooves that receive the projections of said spring-mounting portions, said end portions determining a position of said shutter preventing said shutter from overshooting said frame.

2. An IC card according to claim 1, wherein said shutter has a base portion and two spring-mounting portions extending from back end of said base portion in the vicinity of both sides thereof in the direction of reciprocation, said projections being formed on both sides of said base portion and on each of said spring-mounting portions, end portions which are formed at the front end of the respective guide grooves receiving the projection of said spring-mounting portion determining a position of said shutter preventing said shutter from overshooting said frame.

* * * * *